(12) United States Patent
Stevens

(10) Patent No.: US 6,519,659 B1
(45) Date of Patent: Feb. 11, 2003

(54) METHOD AND SYSTEM FOR TRANSFERRING AN APPLICATION PROGRAM FROM SYSTEM FIRMWARE TO A STORAGE DEVICE

(75) Inventor: Curtis E. Stevens, Irvine, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,067

(22) Filed: Jun. 18, 1999

(51) Int. Cl.[7] .......................... G06F 13/14; G06F 13/16
(52) U.S. Cl. ............................ 710/15; 710/18; 713/2; 714/10
(58) Field of Search ..................... 713/2; 714/10; 710/15, 18

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A * | 8/1992 | Ottman et al. ............. 395/700 |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A * | 8/1995 | Chang ..................... 395/200.1 |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,497,492 A * | 3/1996 | Zbikowski et al. ......... 395/700 |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |

(List continued on next page.)

Primary Examiner—Jeffrey Gaffin
Assistant Examiner—Rehana Perveen

(57) ABSTRACT

One aspect of the invention is a method and system for accessing at least one storage element in a processor-based system. The system comprises a memory for storing instruction sequences by which the processor-based system is processed. The memory has at least one storage element. A processor is coupled to the memory, and a storage device is coupled to the processor. Prior to booting an operating system on the processor-based system, the stored instruction sequences cause the processor to write the contents of the at least one storage element to the storage device. Another aspect of the invention relates to a computer system having a user computer in communication with a remote service computer. The remote service computer has access to a database identifying information available to the service computer. A computer implemented method for transferring information to the user computer, comprises: writing the contents of at least one storage element to a storage device on the user computer prior to booting an operating system on the user computer, establishing a communications link between the user computer and the service computer, and presenting at the user computer, information available to the user computer.

24 Claims, 13 Drawing Sheets

U.S. PATENT DOCUMENTS

| | | |
|---|---|---|
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 6,081,508 A * | 6/2000 | West et al. .................. 370/238 |
| 6,240,550 B1 * | 5/2001 | Nathan et al. ................ 717/11 |

* cited by examiner

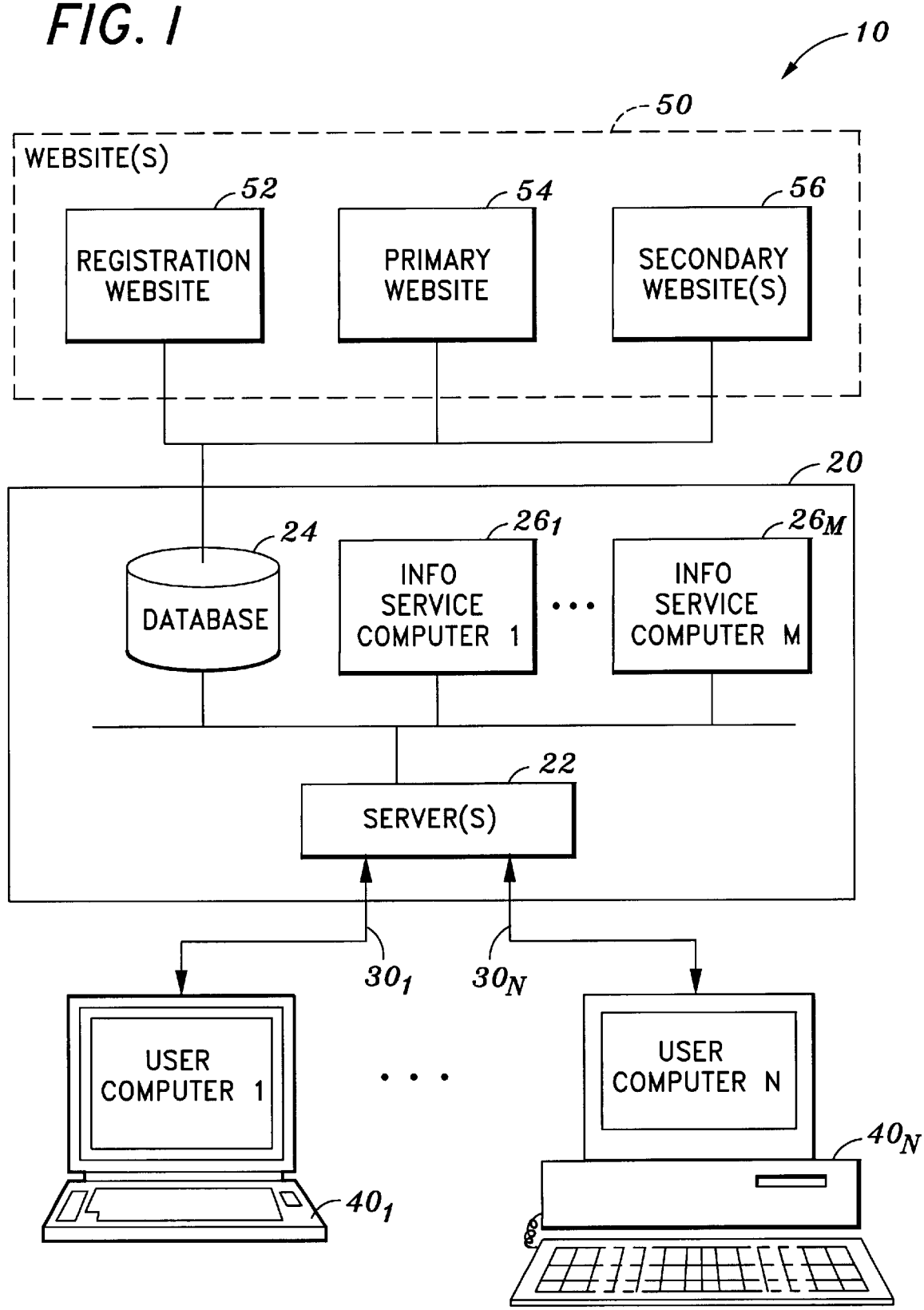

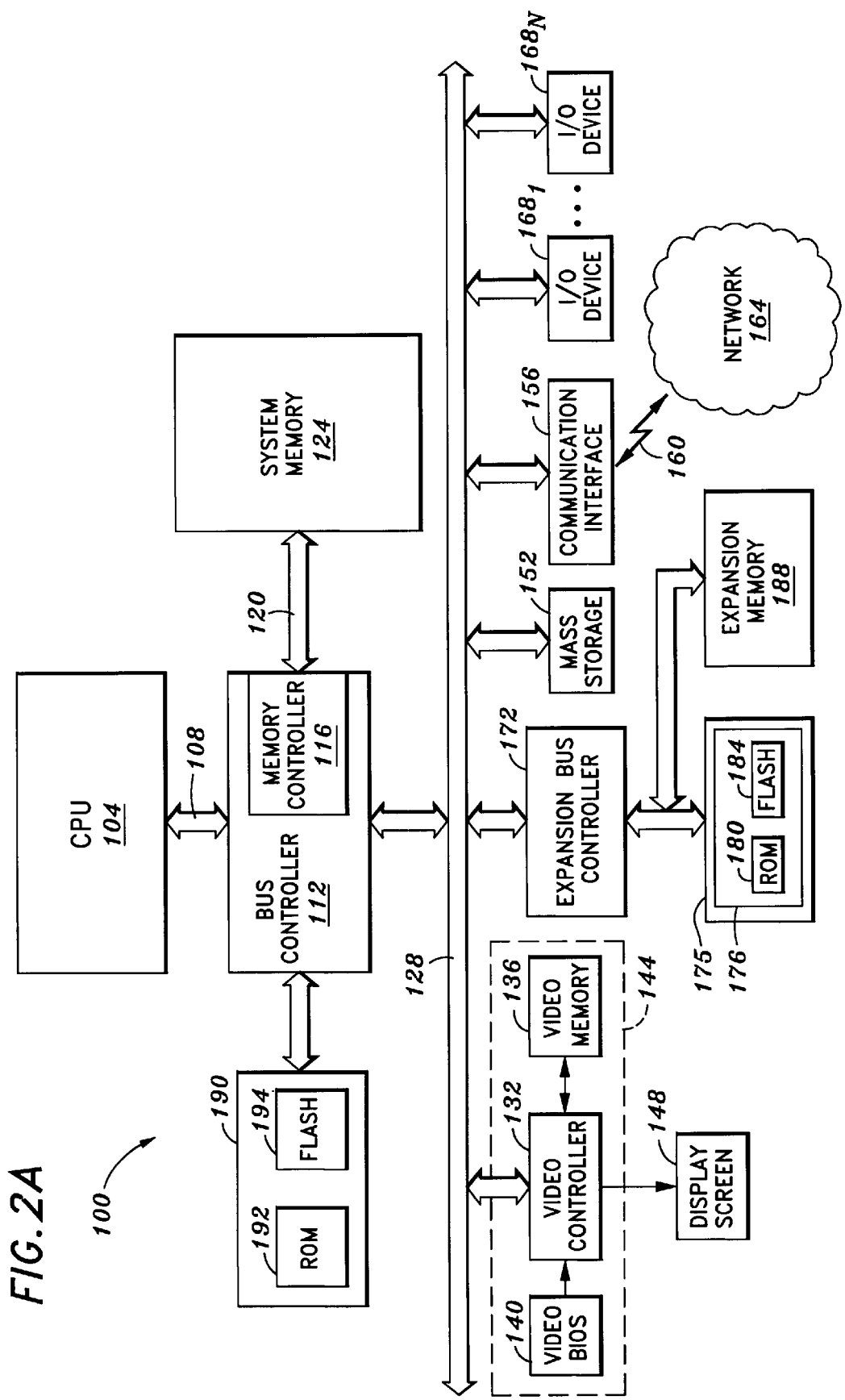

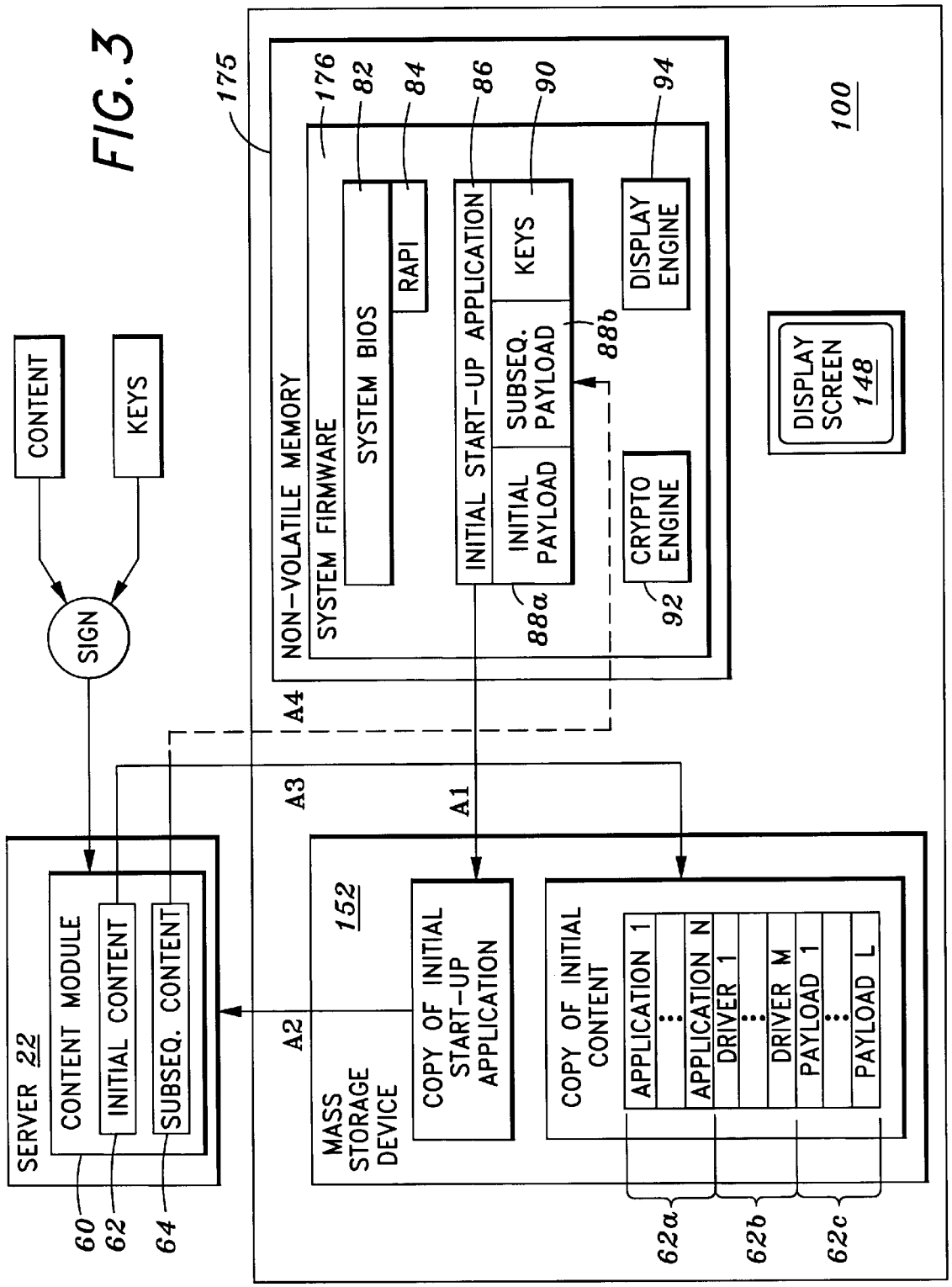

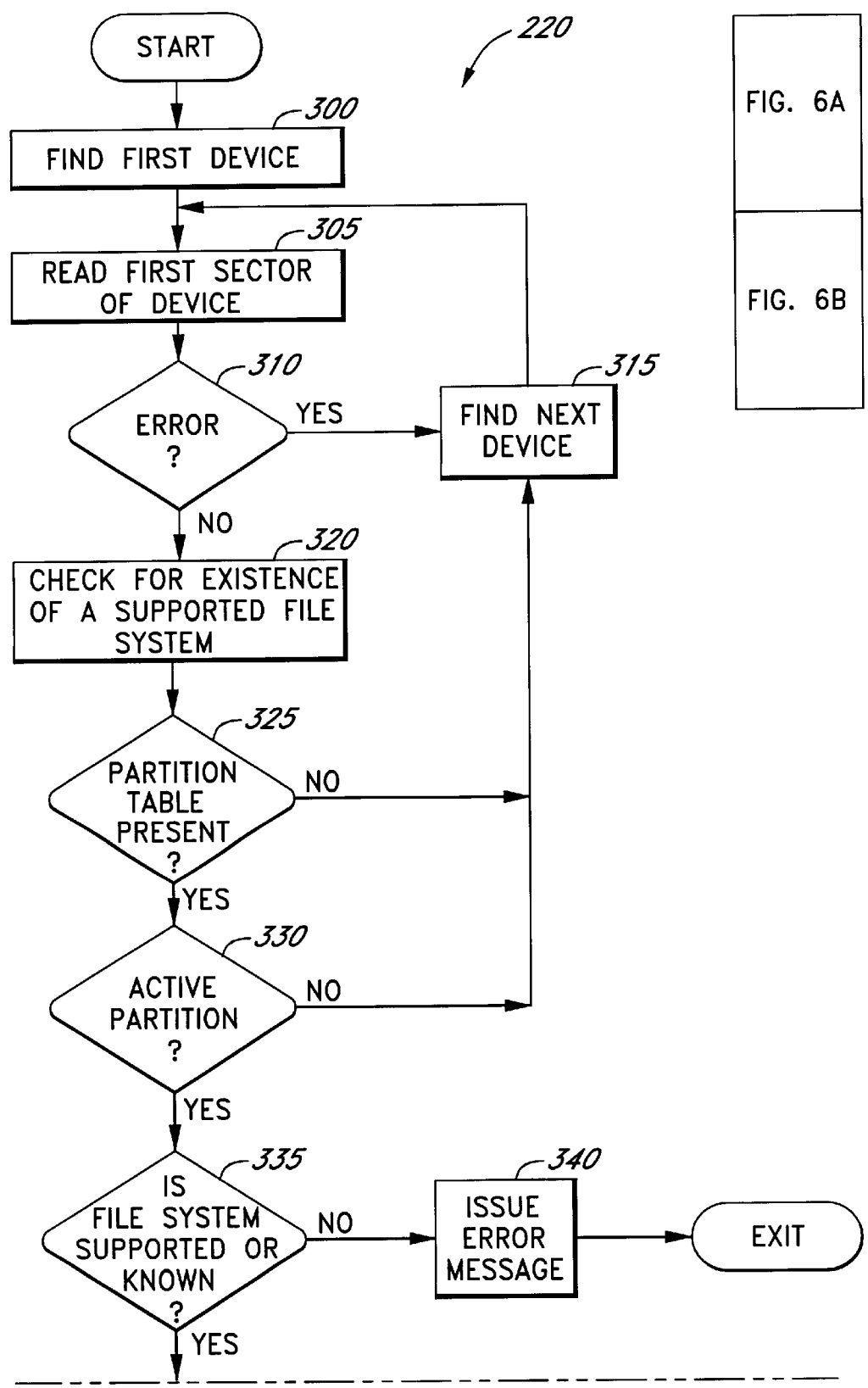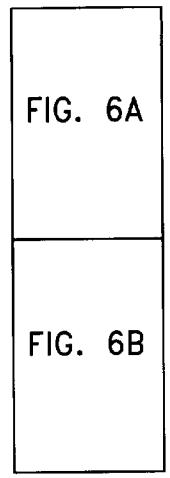

METHOD AND SYSTEM FOR TRANSFERRING AN APPLICATION PROGRAM FROM SYSTEM FIRMWARE TO A STORAGE DEVICE

BACKGROUND OF THE INVENTION

1. Field of the Invention

The present invention relates generally to memory in processor-based or micro-controller-based systems, and more particularly, to a system and method transferring an application program from system firmware to a storage device without the need for an operating system and/or a directory service.

2. Description of the Related Art

In processor-based systems such as computers, an operating system must first be installed before other application software may be subsequently installed and executed. The operating system software is typically installed from compact disks or diskettes. In certain cases, the operating system must be extended via device drivers, or some other software component, to bring the system up to a level of performance required by the motherboard manufacturer or the system manufacturer. This creates several problems, involving the transport of these device drivers.

Systems are manufactured in stages. The first stage involves the gathering of various components to construct a system motherboard. The second stage involves creating a basic computer by combining a system motherboard with a power supply, hard drive and other internal components. The third stage involves the integration of the basic computer with various peripherals such as a monitor, printer, speakers, keyboard, and mouse.

Each manufacturing stage may have unique requirements, advancements in technology or involve different testing and failure resolutions. Because the various stages of manufacture can happen in different physical locations, and in different companies, device drivers or special software that is added to the target operating system adds extra cost to the system. This extra cost is incurred because the additional drivers or special software must be transported on a floppy disk, a compact disk, or other media with each system. Further, extra items like floppy disks or compact disks can easily be lost or stolen.

Moreover, as technology evolves, the system hardware can provide functionality that current operating systems are unable to use. Today, there is no reliable method available for the system firmware or BIOS to pass on the capability to control new hardware or provide extended system functionality. For example, systems are now incorporating real-time video display. Although the hardware is present to do this function, the operating system is unable to display the real-time video. As discussed earlier, a system manufacturer could supply the user with a diskette or compact disk (CD) that has the software necessary for displaying real-time video. The problem with this is that a motherboard can pass through several middle men before it is incorporated into a system and sold to and end-user, allowing the diskette or CD to be easily lost or destroyed.

Accordingly, there is a need in the technology for a system and method for overcoming the aforementioned problems. In particular, there is a need for a system and method for delivering applications from system firmware to a storage device without the need for or availability of an operating system and/or a directory service.

BRIEF SUMMARY OF THE INVENTION

One aspect of the invention is a method and system for accessing at least one storage element in a processor-based system. The system comprises a memory for storing instruction sequences by which the processor-based system is processed. The memory has at least one storage element. A processor is coupled to the memory, and a storage device is coupled to the processor. Prior to booting an operating system on the processor-based system, the stored instruction sequences cause the processor to write the contents of the at least one storage element to the storage device.

Another aspect of the invention relates to a computer system having a user computer in communication with a remote service computer. The remote service computer has access to a database identifying information available to the service computer. A computer implemented method for transferring information to the user computer, comprises: writing the contents of at least one storage element to a storage device on the user computer prior to booting an operating system on the user computer, establishing a communications link between the user computer and the service computer, and presenting at the user computer, information available to the user computer.

BRIEF DESCRIPTION OF THE DRAWINGS

FIG. 1 is a system block diagram of one embodiment of an information distribution system in which the apparatus and method of the invention is used.

FIG. 2A illustrates an exemplary processor system or user computer system which implements embodiments of the present invention.

FIG. 3 illustrates a diagram of one embodiment of the computer system of FIG. 2A, in which the apparatus and method of invention is used.

FIGS. 6A and 6B illustrate a flow chart of one embodiment of the file or payload application installation process 220 of FIG. 5A or 260 of FIG. 5B.

DETAILED DESCRIPTION OF THE PREFERRED INVENTION

Figure 2B:
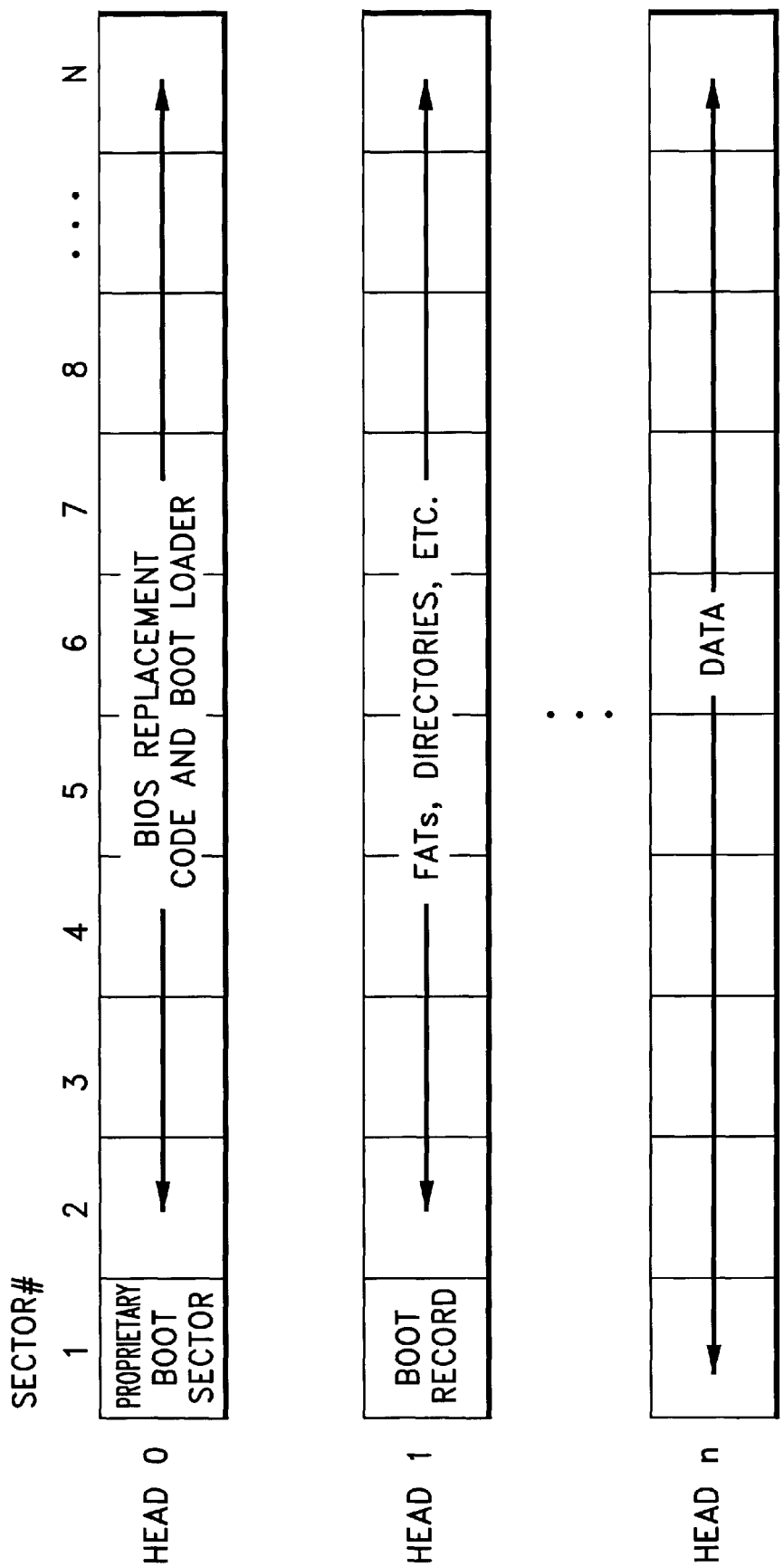
FIG. 2B depicts one embodiment of a sector allocation technique implemented by typical operating systems for the first couple of heads on cylinder number 0.

The present invention relates to a system and method for providing an application without the need for an operating system or directory service. In one embodiment, the payload or file is initially stored in a processor system's non-volatile storage. A payload delivery program transfers the file or payload into an initialization or start-up directory of the system prior to installation of the file or payload. The file or payload is subsequently installed after the operating system is fully booted.

The invention allows motherboard vendors to differentiate their products by providing extended functionality that can be automatically installed when the operating system is updated or changed. This extended functionality can operate new or "different" system hardware, or it can be a software based capability, such as a branded Internet browser. Some operating systems may be configured to automatically run a program during the operating system boot if the program is placed in a specific directory.

Another aspect of the invention relates to a system and method for providing an Infomediary. It involves the construction and maintenance of a secure and private repository of Internet user and system profiles, collected primarily from warranty service registrations, internet service registrations, system profiles and user preferences. Initially, this information is used to register the user with the manufacturers of purchased hardware and software products, and with the providers of on-line or other services. Over time, the user data will be used to profile and notify users of relevant software updates and upgrades, to encourage on-line purchases of related products and to enable one-to-one marketing and other services.

A further aspect of the invention relates to pre-boot screen messaging. Software or firmware may be used to provide customized screens in the form of messages possibly with embedded graphics, during the pre-boot process of the system. These messages may take the form of an advertisement. In one embodiment, graphics that was previously stored on ROM may be retrieved for display on the screen during the pre-boot process. When a link has been established with the predetermined web site, additional graphics may be used. Such additions include updates or messages that are either provided arbitrarily or provided based on the information obtained from a survey of the user or the user's system. In one embodiment, once the boot process is completed, a portion of the display screen may be used to provide icons that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected messages or advertisements.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, file, payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications. Power On Self Test ("POST") refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional files or payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 07/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown) that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. In one embodiment, such a transfer of user and system profile is provided in a secure manner, as described in co-pending U.S. patent application Ser. No. 07/336,068, entitled "Method and apparatus for Transferring Profile Data to a Server Using a ROM-Based Security key," filed Jun. 18, 1999, assigned to Phoenix Technologies Ltd., the contents of which are incorporated herein by reference. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

FIG. 2A illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2A, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_n$, may be disk drive, such as a compact disk drive, a digital disk drive, a tape drive, a zip drive, a jazz drive, a digital video disk (DVD) drive, a magneto-optical disk drive, a high density floppy drive, a high capacity removable media drive, a low capacity media device, and/or any combination thereof. The expansion bus controller 172 is coupled to non-volatile memory 175, which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188a having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The computer's operating system typically specifies a particular organization of data on a hard disk. To facilitate the storage and retrieval of data in an orderly manner, computer hard disks are typically organized in blocks called sectors. These sectors are located on the disk by a set of unique specifiers called cylinder (or track), head (or side) and sector number. In personal computers, cylinders are conventionally numbered from zero to the maximum allowed by a given disk; heads are numbered from zero to the maximum number for a given cylinder and sectors are numbered from 1 to the highest sector number for a given cylinder and head. Alternatively, these unique identifiers may simply be a sector number that stands at O-NN, where NN is the highest sector number.

FIG. 2B depicts one embodiment of a sector allocation technique implemented by typical operating systems for the first couple of heads on cylinder number 0. The BIOS supports a hard disk that includes a convention of reading the cylinder 0, head 0, sector 1 from the first hard disk to boot the operating system. This sector (0/0/1) is known as the Master Boot Record or partition sector, and contains information regarding how the hard disk is divided into partitions and provides enough executable code to locate the partition that is marked as bootable. The partition sector includes information regarding the individual partitions and is stored using partition entries in a partition table. During the boot process, the first sector of the partition is copied to memory and then executed.

FIG. 3 illustrates a logical diagram of computer system 100. Referring to FIGS. 2A and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. RAPI 84 provides a secure interface between ROM application programs and system BIOS 82. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd. One embodiment of RAPI 84 is described in co-pending U.S. patent application Ser. No. 09/336,889, entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289, entitled "Method and Apparatus for Automatically Installing and Configuring Software on a Computer," filed on Jun. 18, 1999, assigned to Phoenix Technologies, Ltd., the contents of which are incorporated herein by reference.

Figure 4A:
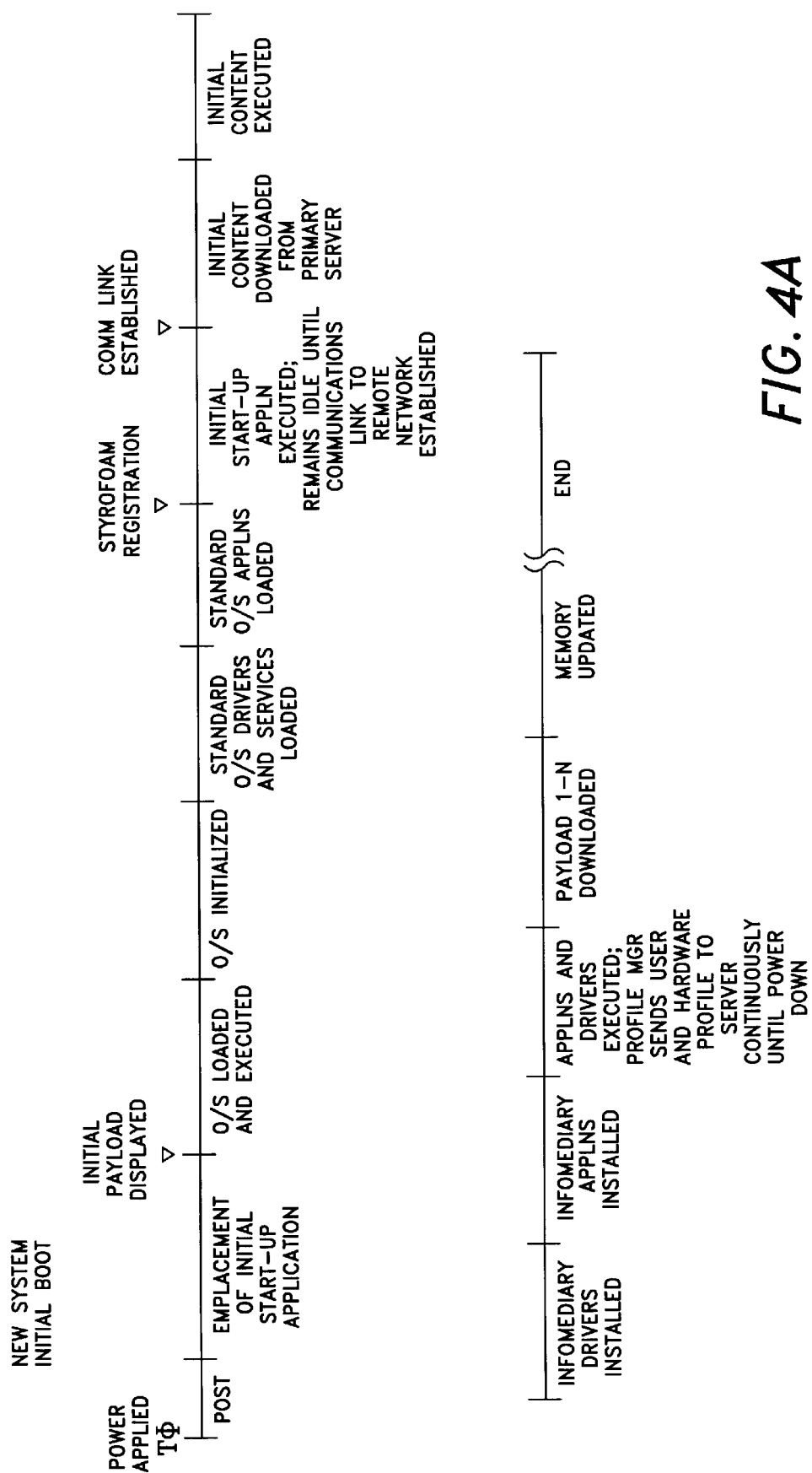
FIGS. 4A and 4B illustrate one embodiment of a system process flow chart provided in accordance with the principles of the invention.
Figure 4B:
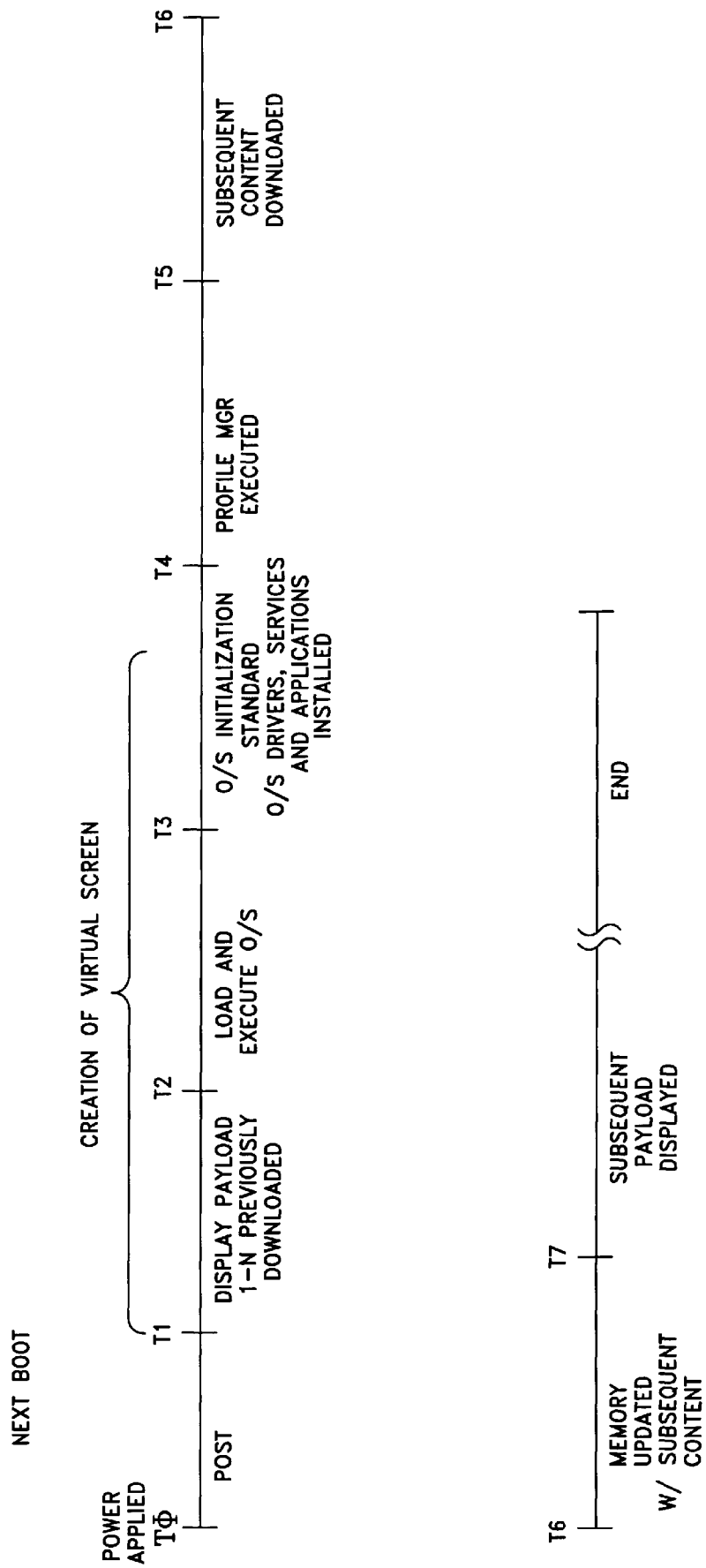

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to booting, loading and running of the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the transfer process is described in FIGS. 5–8 and in the accompanying text (see "Delivery Process"). Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent Continuation-in-Part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference. In one further embodiment, if, after the transfer of the ISUA 86, it is found that ISUA 85 is not functioning or is defective, it is automatically de-installed. One technique for such de-installation is described in co-pending U.S. patent application Ser. No. 09/336,254, entitled "Method and Apparatus to Automatically De-Install an Application Module When Not Functioning," filed Jun. 18, 1999, assigned to Phoenix Technologies Ltd., the assignee of the present invention, the contents of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes. In one embodiment, such a display process is described in co-pending U.S. patent application Ser. No. 09/336,180, entitled "Method and Apparatus for Extending BIOS Control of Screen Display Beyond Operating System Boot," assigned to Phoenix Technologies Ltd., the assignee of the present invention, the contents of which are incorporated herein by reference.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2A (e.g., over the Internet). It should be noted that although ISUA 86 is shown as being stored in system firmware 176, it may alternatively be located in system memory 124, memory module 190, mass storage 152, any of the I/O devices 168 or provided in a communication interface 156.

In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system or while the OS is loading. In one embodiment, such a display process is described in co-pending U.S. patent application Ser. No. 09/336 180, entitled "Method and Apparatus for Extending BIOS Control of Screen Display Beyond Operating System Boot," filed Jun. 18, 1999, assigned to Phoenix Technologies Ltd., the assignee of the present invention, the contents of which are incorporated herein by reference. Such a process may be used to extend the display content beyond the loading of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

DELIVERY PROCESS

Figure 5A:
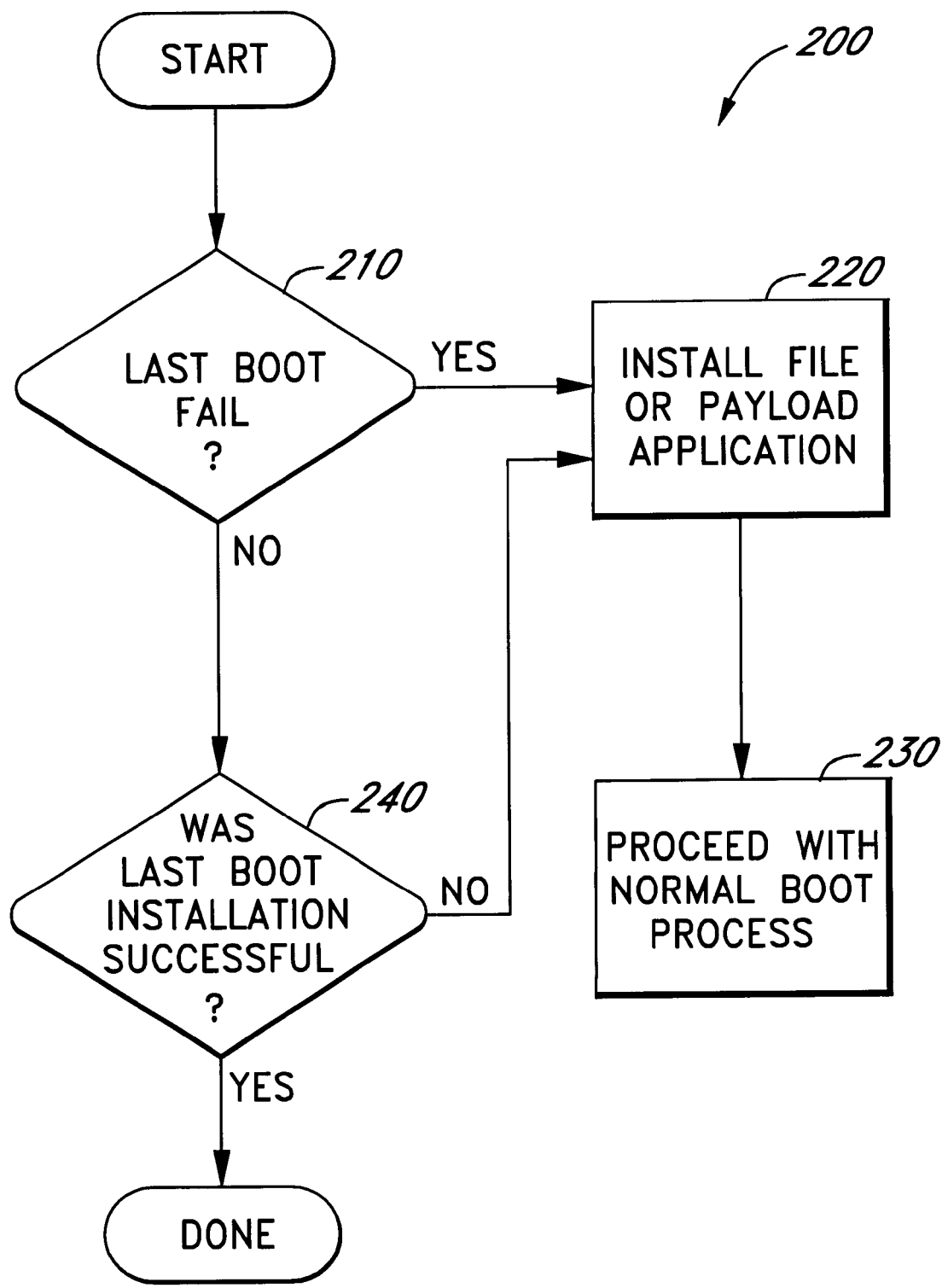
FIG. 5A illustrates a flowchart of one embodiment of the file or payload delivery process of the present invention.

FIG. 5A illustrates a flowchart of one embodiment of the file or payload delivery process 200A of the present invention. In one embodiment, the file or payload comprises at least one application program. In an alternate embodiment, the file comprises data and/or graphics. The file may also comprise a payload. The file or payload delivery process 200A is an application (that may be stored in system memory 124, memory 176 (see FIG. 2A), expansion memory 188a, memory module 190 or be provided via any of the peripheral modules $168_1$–$168_N$) that transfers a payload from a nonvolatile storage to a predetermined device. In one embodiment, the predetermined device is a mass storage device 152, such as a hard disk. In alternate embodiments, the device may be any storage device, including but not limited to a CD ROM, a zip disk, a floppy disk and flash memory.

Beginning from a power-on start state, the process 200A proceeds to decision block 210 where it queries if the previous boot process had failed. If so, the process 200A advances to process block 220, where it installs the file, application or payload. The process 200A then proceeds to process block 230, where it proceeds with the normal boot process. If, at decision block 210, the process determined that the previous boot process had failed, it advances to decision block 240, where it queries if the previous boot installation process was successful. One example of an unsuccessful boot installation process includes abortion of the boot process by the user. If the previous boot installation process was unsuccessful, the process proceeds to process block 220, where the file or payload is installed. Otherwise, the process 200A is complete.

Figure 5B:
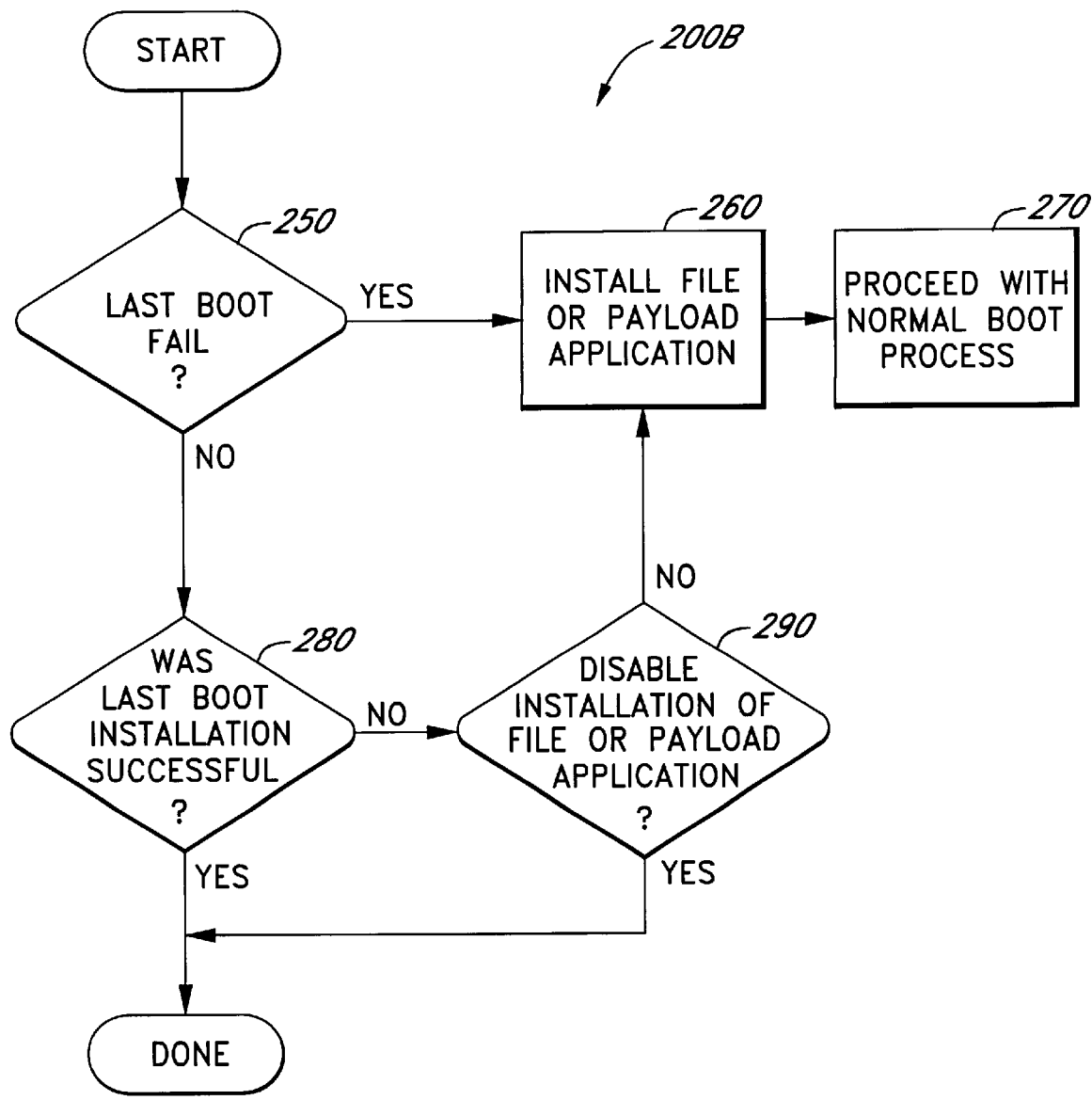
FIG. 5B illustrates a flowchart of a second embodiment of the file or payload delivery process 200B of the present invention.

FIG. 5B illustrates a flowchart of a second embodiment of the file or payload delivery process 200B of the present invention. Beginning from a power-on start state, the process 200B proceeds to decision block 250 where it queries if the previous boot process had failed. If so, the process 200B advances to process block 260, where it installs the file or payload. The process 200B then proceeds to process block 270, where it proceeds with the normal boot process. If, at decision block 250, the process 200B determined that the previous boot process had failed, it advances to decision block 280, where it queries if the previous boot installation process was successful. If so, the process 200B is complete. If not, the process proceeds to decision block 290, where it determines if installation of the file or payload should be disabled. If not, the process 200B proceeds to process block 260, where the file or payload is installed. Otherwise, the process 200B is complete.

Figure 6B:
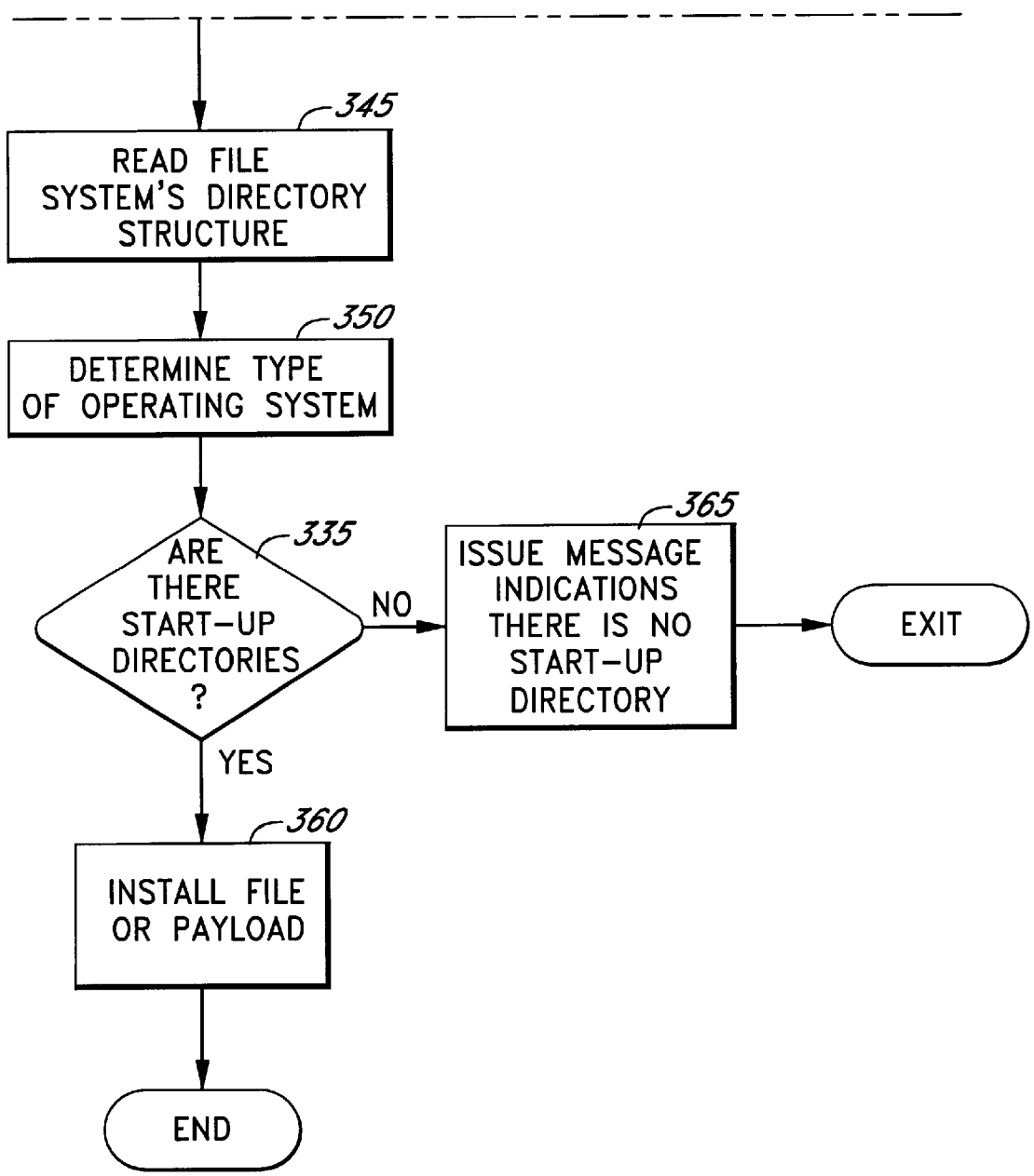

FIGS. 6A and 6B illustrate a flow chart of one embodiment of the file or payload application installation process 220 of FIG. 5A or 260 of FIG. 5B. For discussion purposes, this process will be referred to as the process 220. Commencing from a start state, the process 220 advances to process block 300, where it locates the first device installed on the system. In one embodiment, the first device is a mass storage device such as a hard disk. The process 220 next reads the first sector of the disk (process block 305). In one embodiment, the first sector is a boot sector of the device. The process 220 then determines if there was an error in reading the first sector (decision block 310). If so, the process 220 proceeds to process block 315, where it locates the next device installed on the system. If, at decision block 310, there was no error in reading the first sector, the process 220 proceeds to check for the existence of a supported file system (process block 320). The process 220 performs this by first determining if a partition table is present on the device, as shown in decision block 325. If not, it proceeds to process block 315, where it locates the next device. Otherwise, it proceeds to decision block 330, where it examines the partition table to determine if the partition is active. If not, it proceeds to process block 315. Otherwise, it proceeds to decision block 335.

At decision block 335, the process 220 queries if the file system on the device is a supported or known system. If not, the process 220 proceeds to process block 340, where it issues an error message, such as "file system is not supported" and exits. If the file system is supported or known, the process 220 proceeds to process block 345, where it reads the file system's directory structure and parses through the known subdirectories. The process 220 then determines the operating system by reading a set of specific files and parses the content of the files. The process 220 then queries if there is an initialization or start-up directory. A start-up directory is a directory that is used by default to locate files of information when it starts up. If so, the process 220 proceeds to decision block 355, where it queries if there is a start-up directory. If so, the process 220 installs the file or payload (process block 360) and then terminates. Otherwise, the process 220 issues a message or signal indicating that there is no start-up directory, as shown in process block 365, and exits.

Figure 7A:
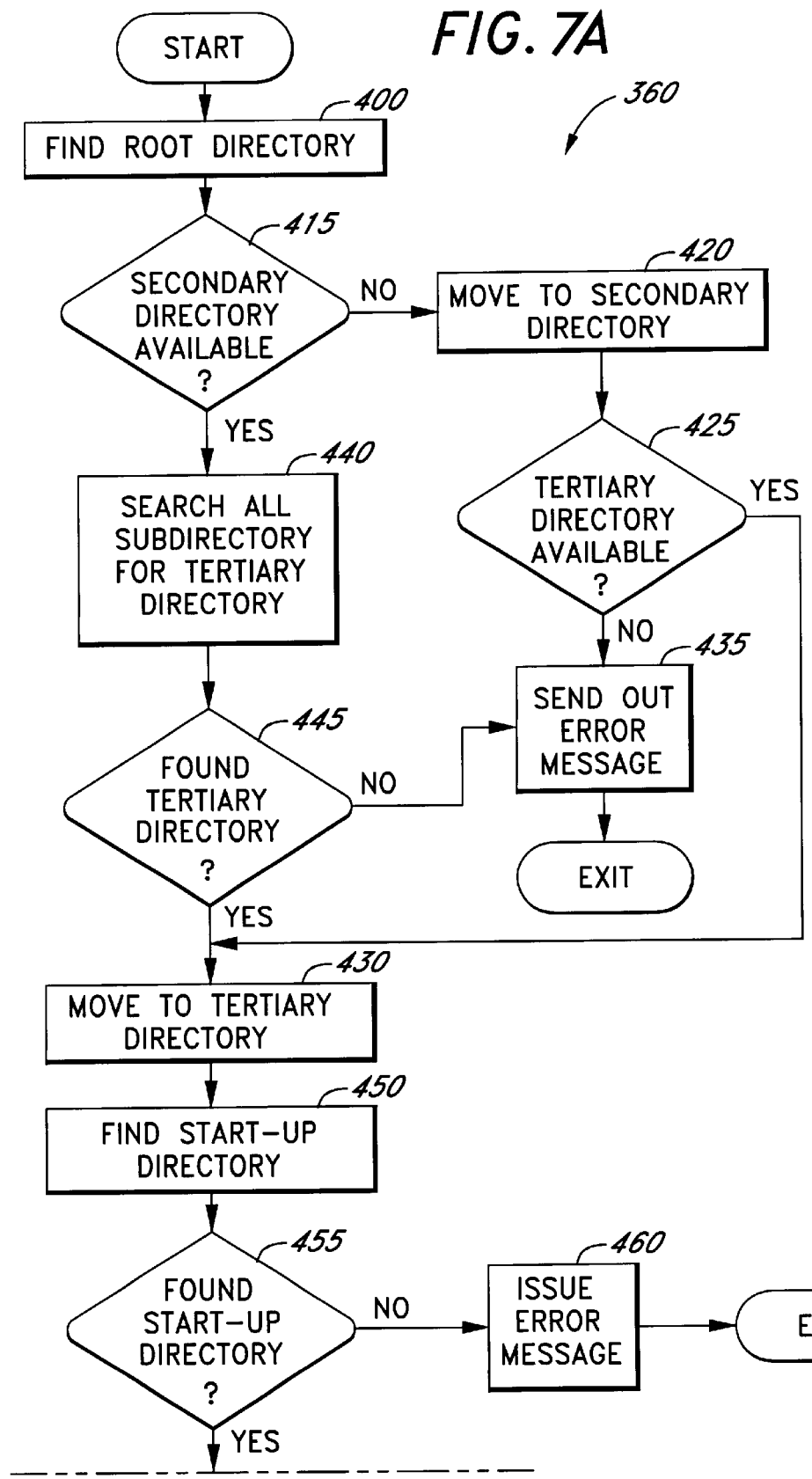
FIGS. 7A and 7B are flowcharts illustrating one embodiment of the file or payload installation process 360 of FIGS. 6A and 6B.
Figure 7:
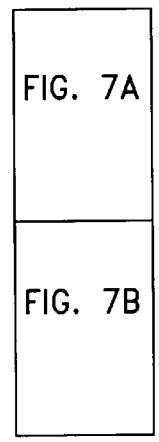
Figure 7B:
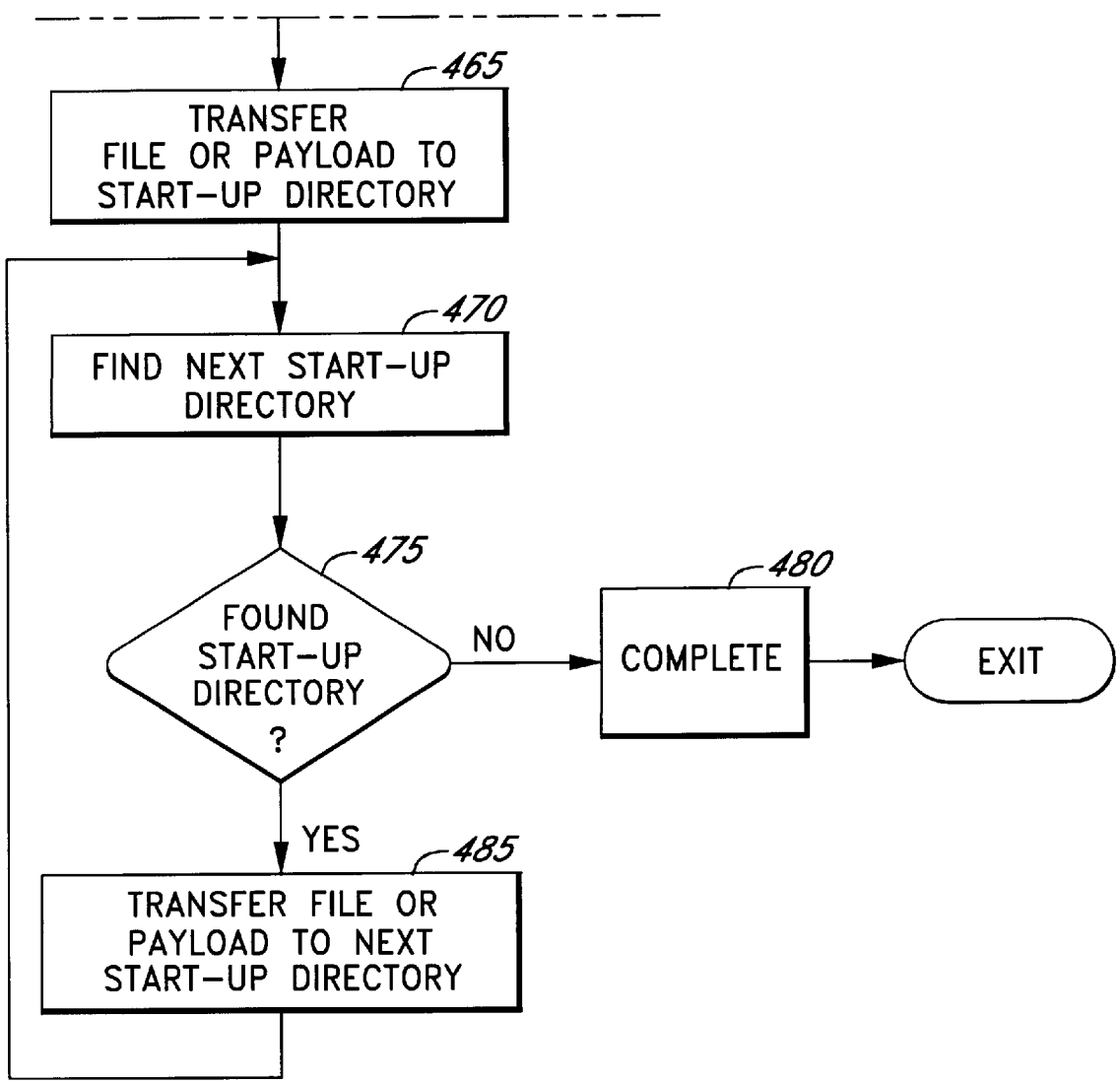

FIG. 7 is a flowchart illustrating one embodiment of the file or payload installation process 360 of FIGS. 6A and 6B. Commencing from a start state, the process 360 proceeds to process block 400, where it locates the root directory of the file system. The process 360 then queries if a secondary directory, for example, a Windows directory, is available (process block 415). If so, the process 360 proceeds to process block 420, where it advances to the secondary directory. The process 360 then queries if a tertiary directory (such as a profiles directory) is available (process block 425). If so, the process 360 proceeds to process block 430. Otherwise, it issues an error message (process block 435) and exits. If, at decision block 425, the process 360 determines that the secondary directory is not available, it proceeds to process block 440, where it searches all the subdirectories for the tertiary directory. The process 360 then moves on to decision block 445, where it queries if the tertiary directory is found. If not, it proceeds to process block 435. Otherwise, it proceeds to process block 430, where it advances to the tertiary directory.

The process 360 then locates the start-up directory, as shown in process block 450. It subsequently determines if the start-up directory is found, as shown in decision block 455. If not, it issues an error message (process block 460) and exits. Otherwise, it transfers the file or payload to the start-up directory (process block 465). The process 360 subsequently locates the next start-up directory (process block 470). It queries if the next start-up directory is found (decision block 475). If not, the process 360 is complete, and terminates. Otherwise, it proceeds to process block 485, where it transfers the file or payload to the next start up directory and returns to process block 470 to locate the next start-up directory.

Figure 8:
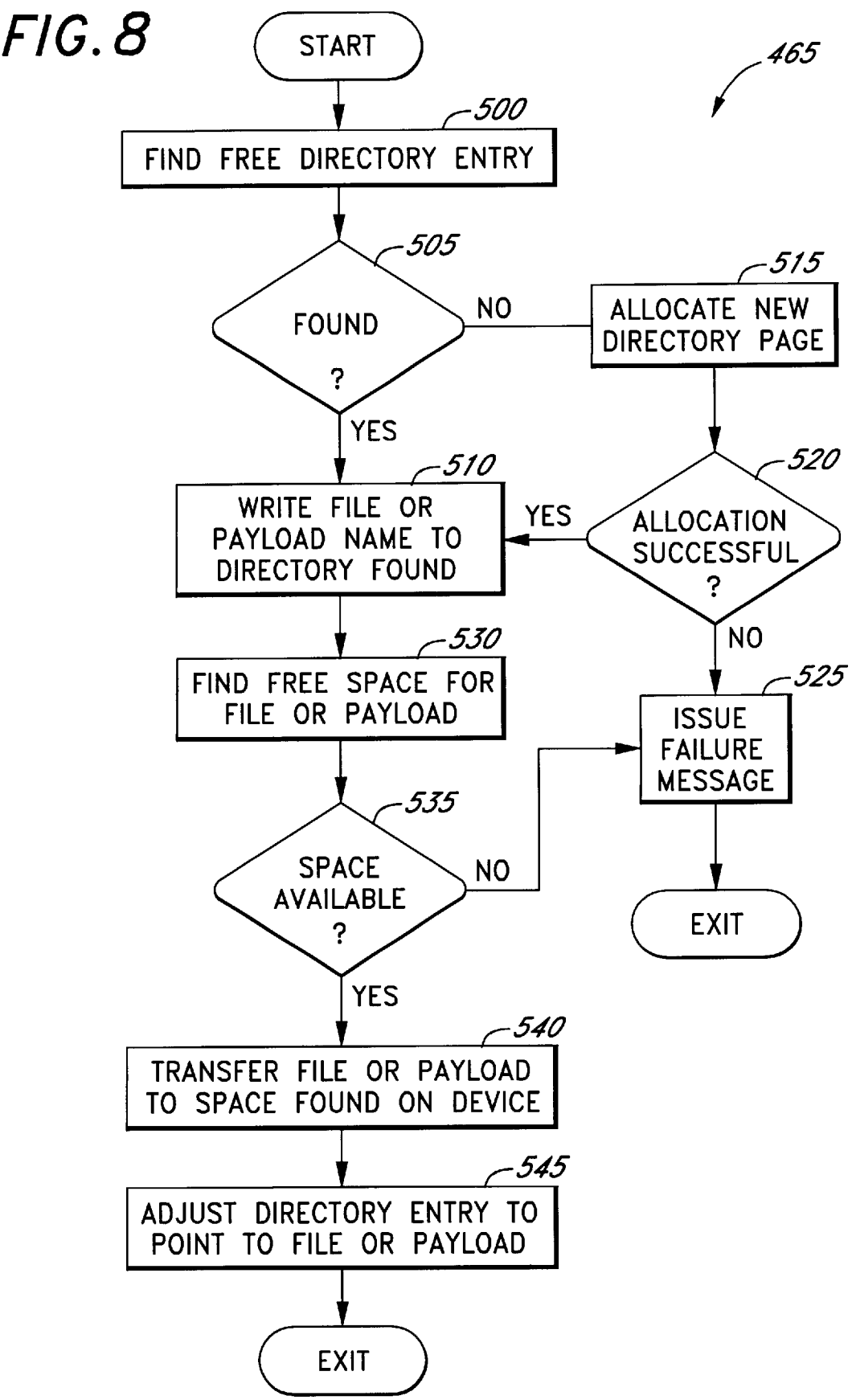
FIG. 8 is a flow chart of one embodiment of the transfer file or payload process 465 or 485 of FIG. 7.

FIG. 8 is a flow chart of one embodiment of the transfer file or payload process 465 or 485 of FIG. 7. For present discussion purposes, the processes 465 and 485 will be referred to as process 465. Beginning from a start state, the process 465 proceeds to process block 500, where it attempts to locate a free (unoccupied) directory entry. The process 465 next queries if the free directory entry is found (decision block 505). If so, it writes the name of the file or payload to the directory found (process block 510). Otherwise, it allocates a new directory page (process block 515) and advances to decision block 520, where it determines if the allocation is successful. If so, it proceeds to process block 510. Otherwise, it proceeds to process block 525, where it issues a failure message and exits.

From process block 510, the process 465 proceeds to process block 530, where it locates a free (unoccupied) space for transfer of the file or payload. It subsequently queries if this space is available, as shown in decision block 535. If not, the process 465 proceeds to process block 525. Otherwise, it proceeds to process block 540, where it transfers the file or payload to the space found on the device. The process 465 then adjusts the directory entry to point to the file or payload, and thereafter, terminates.

The present invention thus provides a system and method for delivering applications from system firmware to a storage device (such as compact disk (CD) drive, digital disk drive (DVD) drive, tape drive, floppy drive, hard drive, magneto-optical drive, document scanner, solid state memory device, zip drive, jazz drive, high density floppy drive (such as the Sony Hi FD drive), high capacity removable media device, low capacity removable media device, and combination high and low capacity removable media device (such as the Panasonic LS 120/super disk drive)) without the need for or availability of an operating system or a directory service.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system for accessing at least one storage element in a processor-based system, comprising:
   a memory for storing instruction sequences by which the processor-based system is processed, the memory having at least one storage element;
   a processor coupled to said memory, the processor executes the stored instruction sequences; and
   a storage device coupled to the processor, where said storage device is local to the processor and the memory;
   wherein prior to booting an operating system, the stored instruction sequences cause the processor to write the contents of the at least one storage element to the storage device, said act of writing being performed independent of a post-boot application program.

2. The system of claim 1, wherein the act of writing the contents of the at least one storage element to the storage device occurs prior to loading the operating system.

3. The system of claim 1, wherein the instruction sequences further cause the processor to initiate a boot sequence.

4. The system of claim 1, wherein the at least one storage element is a non-volatile memory.

5. The system of claim 2, wherein the storage device is selected from a group consisting of: a compact disk drive, a digital video disk (DVD) drive, a solid state memory device, a digital disk drive, a hard disk drive, magneto-optical disk drive, a tape drive, a zip drive, a jazz drive, a high density floppy drive, a high capacity removable media device, a low capacity removable media device, and a combination high and low capacity removable media device.

6. The system of claim 1, wherein the storage device comprises a file system; wherein in the act of writing the contents of the at least one storage element to the storage device, the at least one storage element is a file; and wherein the act of writing comprises transferring said file to said file system in said storage device.

7. The system of claim 1, wherein writing the contents of the at least one storage element to the storage device comprises:
   (a) locating a start-up directory stored in said memory;
   (b) writing a name corresponding to the at least one storage element, to said start-up directory; and
   (c) transferring the contents of said at least one storage element to said storage device;
   (d) setting a directory pointer to said transferred contents.

8. A method for accessing at least one storage element in a processor-based system having a processor coupled to the at least one storage element and a storage device coupled to the processor, said storage device being local to the processor, comprising:
   writing the contents of the at least one storage element to the storage device prior to booting an operating system on the processor-based system, wherein said writing is performed independent of a post-boot application program.

9. The method of claim 8, wherein the act of writing the contents of the at least one storage element to the storage device occurs prior to loading the operating system.

10. The method of claim 8, further comprising initiating a boot sequence.

11. The method of claim 8, wherein in the act of writing, the at least one storage element is a non-volatile memory.

12. The method of claim 8, wherein the storage device is selected from a group consisting of: a compact disk drive, a digital disk drive, a digital video disk (DVD) drive, a solid state memory device, a hard disk drive, magneto-optical disk drive, a tape drive, a zip drive, a jazz drive, a high density floppy drive, a high capacity removable media device, a low capacity removable media device, and a combination high and low capacity removable media device.

13. The method of claim 8, wherein the storage device comprises a file system; wherein in the act of writing the contents of the at least one storage element to the storage device, the at least one storage element is a file; and wherein the act of writing comprises transferring said file to said file system in said storage device.

14. The method of claim 8, wherein writing the contents of the at least one storage element to the storage device comprises:
   (a) locating a start-up directory stored in said memory;
   (b) writing a name corresponding to the at least one storage element, to said start-up directory;
   (c) transferring the contents of said at least one storage element to said storage device;
   (d) setting a directory pointer to said transferred contents.

15. A computer readable program product, comprising:
   a computer usable medium having computer program code embodied therein for accessing at least one storage element in a processor-based system, the computer program product having:
   computer readable program code for writing the content of the at least one storage element to a storage device prior to booting an operating system on the processor-based system, said storage device to be local to the at least one storage element, said act of writing being performed independent of a post-boot application program.

16. The computer readable program product of claim 15, wherein the computer readable program code writes the contents of the at least one storage element to the storage device occurs prior to loading the operating system.

17. The computer readable program product of claim 15, further comprising computer readable program code for initiating a boot sequence subsequent to the act of writing.

18. The computer readable program product of claim 15, wherein the at least one storage element is a non-volatile memory.

19. The computer readable program product of claim 15, wherein the storage device is selected from a group consisting of: a compact disk drive, a digital disk drive, a digital video disk (DVD) drive, a solid state memory device, a hard disk drive, a magneto-optical disk drive, a tape drive, a zip drive, a jazz drive, a high density floppy drive, a high capacity removable media device, a low capacity removable media device, and a combination high and low capacity removable media device.

20. The computer readable program product of claim 15, wherein the storage device comprises a file system; wherein in the act of writing the contents of the at least one storage element to the storage device, the at least one storage element is a file; and wherein the act of writing comprises transferring said file to said file system in said storage device.

21. The computer program product of claim 15, wherein the computer readable program code for writing the contents of the at least one storage element to the storage device comprises:

(a) computer readable program code for locating a start-up directory stored in said memory;

(b) computer readable program code for writing a name corresponding to the at least one storage element, to said start-up directory;

(c) computer readable program code for transferring the contents of said at least one storage element to said storage device;

(d) computer readable program code for setting a directory pointer to said transferred contents.

22. In a computer system having a user computer in communication with a remote service computer having access to a database identifying information available to the service computer, a computer implemented method for transferring information to the user computer, comprising:

(a) writing the contents of at least one storage element of the user computer to a storage device on the user computer prior to booting an operating system on the user computer, said writing being performed independent of a post-boot application program;

(b) establishing a communications link between the user computer and the service computer; and (c) presenting at the user computer, information available to the user computer.

23. The method of claim 22, wherein in (a), the contents of the at least one storage element comprises an application program, and wherein the method further comprises:

initiating, by the application program, a transfer of software from the service computer to the user computer, subsequent to (b);

receiving, by the user computer, said software, wherein the software comprises at least one program that collects system information regarding the user computer.

24. The method of claim 23, further comprising:

providing the system information to the service computer;

presenting, by service computer, information based on the system information.

* * * * *